April 15, 1924.

O. T. OHLSON 1,490,181

LINING STRETCHER AND CLAMP

Filed June 10, 1921    2 Sheets-Sheet 1

Oscar Theodore Ohlson,
INVENTOR,

BY Frank Carlson
ATTORNEY.

April 15, 1924.
O. T. OHLSON
1,490,181
LINING STRETCHER AND CLAMP
Filed June 10, 1921    2 Sheets-Sheet 2
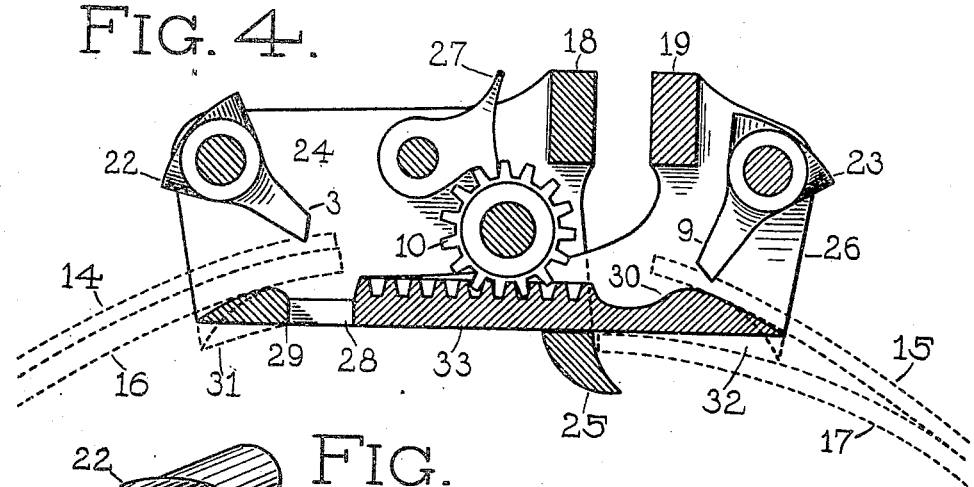
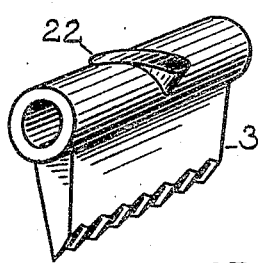
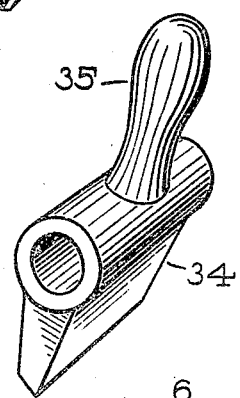
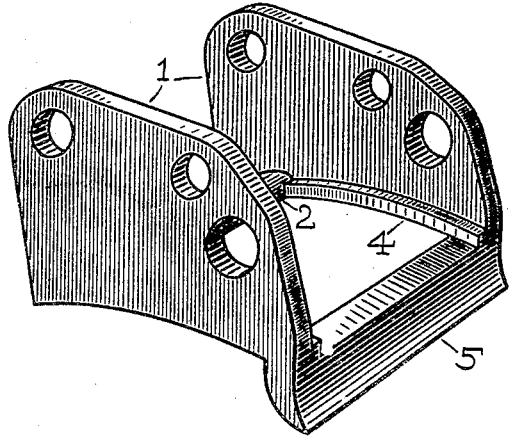
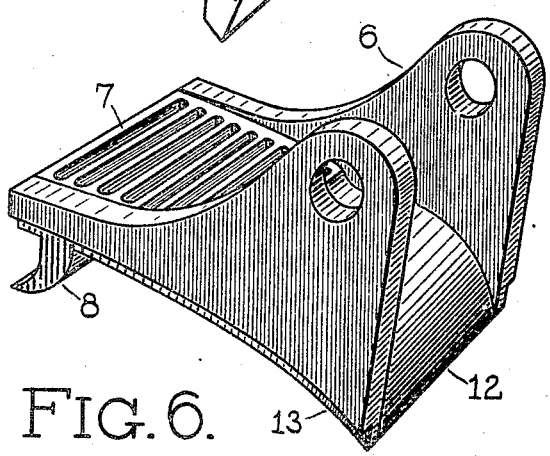
Oscar Theodore Ohlson,
INVENTOR,
BY Frank Carlson
ATTORNEY.

Patented Apr. 15, 1924.

1,490,181

UNITED STATES PATENT OFFICE.

OSCAR THEODORE OHLSON, OF BROOKLYN, NEW YORK.

LINING STRETCHER AND CLAMP.

Application filed June 10, 1921. Serial No. 476,619.

*To all whom it may concern:*

Be it known that I, OSCAR THEODORE OHLSON, a subject of the King of Sweden, Gustavus V, and a resident of 140 Warren Street, in the borough of Brooklyn, county of Kings, and State of New York, have invented certain new and useful Improvements in Lining Stretchers and Clamps, of which the following is a specification.

This invention relates to brake lining clamps and stretchers and especially to that class wherein a pair of oppositely disposed and relatively movable parts are adapted to engage the ends of a brake band to separate the same and likewise to clamp the free ends of a strip of brake lining to tighten the same on said band.

The main object of this invention is to provide a brake lining stretcher which will be simple in construction and operations, very powerful, and adapted to fit all sizes of brake linings.

Another object is to provide a general tool which will be not only a lining stretcher, but an efficient clamp for other uses.

Further objects and advantages will become apparent as this specification proceeds.

In the accompanying drawings:

Fig. 4 is a modification of Fig. 2.

Fig. 5 is a view of one major member of the apparatus shown in the previous views.

Fig. 6 is a view of the other major member of the same apparatus.

Fig. 7 is a view of a third part of said apparatus.

Fig. 8 is a view of a modification of the same part.

Like reference numerals indicate the same parts throughout the views.

Figure 1:
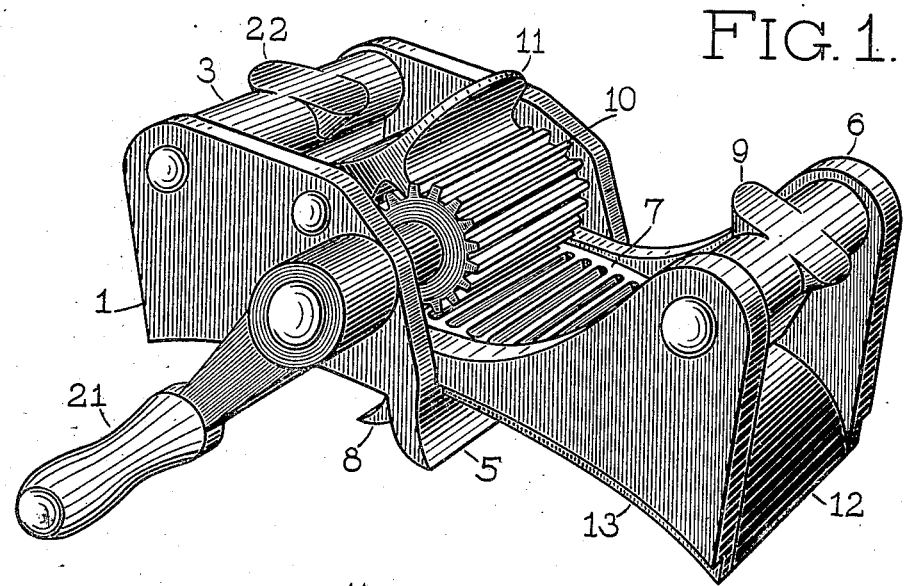
Fig. 1 is a perspective view of an apparatus made according to the present invention.
Figure 2:
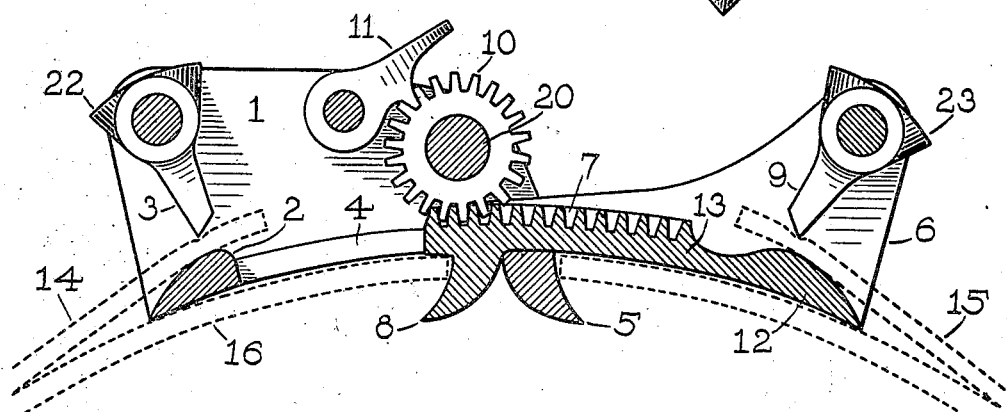
Fig. 2 is a sectional view of the same apparatus in operative position.
Figure 3:
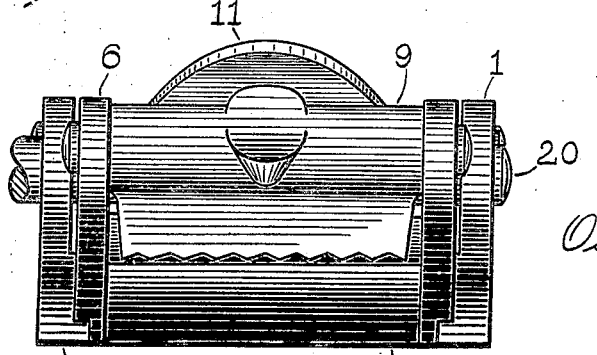
Fig. 3 is an end view of the apparatus shown in Figs. 1 and 2.

When repairing automobiles, it has generally been somewhat difficult to properly reline the emergency brakes of cars. The lining is supposed to lie upon the outside of the brake bands involved and in contact and perfect conformity therewith. This result is rarely obtained. The difficulty arises from the inflexible and tough character of the lining, the common expedient being to wind wire about the lining and its respective band, the wire being depended upon to retain the fabric in position while drilling and riveting it to the brake band. The usual result is that the lining presents in appearance a series of convolutions which are in actual contact with the brake band only at the riveted portions.

As the mentioned wiring method is admittedly a makeshift, it is herein proposed to describe a successful method of stretching or tensing the lining about a brake band while preventing any collapse of said band during the drilling and riveting operations.

Referring again to the drawings, a frame 1 is equipped with a lining table 2 and a gate 3, between which the end of a length of lining may be gripped very securely. A ledge 4 is provided within either side of frame 1 to increase the strength of the same, and specifically for another purpose which will immediately appear the same being true of part 5.

A brake band which is about to be relined may be placed with its extremities 16 and 17 engaging abutment hook 8 and 5, respectively. If a length of brake lining is then placed about the band and the extremities 14 and 15 pushed under gates 3 and 9 on tables 2 and 12 of frame 1 and 6, respectively, a light tap on both gates will be sufficient to cause them to grip the lining, and the apparatus will be set up for action.

As will be noted, the second frame 6 has a gate 9 and a table 12, which latter is extended in the form of a rack 7 and is provided with abutment hook 8, the undercut shoulder 13 adapting the frame to rest or slide on ledge 4 in frame 1. In said frame 1 is secured a pinion gear 10 on shaft 20 to engage rack 7 of the opposite frame.

When gripping the lining, a smart blow on extensions 22 and 23 of the gates will cause them to engage the lining very firmly, while afterwards, when it is to be released a blow on the opposite similar extensions will perform this requirement.

It may also be desirable to have a gate 34 provided with a handle 35 whereby to operate the same instead of the mentioned extensions.

When a crank 21 is attached to shaft 20 and turned clockwise it will rotate gear 10 and cause frame 6 to move inward in frame 1, the gates and tables with the gripped lining extemities approaching each other, while the abutment hooks with the engaged brake band extremities receding an equivalent distance from each other. As the movement of the gates shortens the distance between them, the lining will tend to be drawn snug about the brake band. But this action is doubled by the abutment hooks increasing their distance and enlarging the band within the lining. Soon the parts will have reached their limit of movement, and a pawl 11 by engaging the teeth of gear 10, will take care of the attained tension.

The lining may now be drilled and riveted with ease, as it is rigidly in contact with the brake band. When this is finished, the crank may be forced a little to disengage the pawl, the latter being lifted by depressing its upper portion. The lining is then disengaged from the gates and the apparatus laid aside, after which it is but necessary to drill and rivet the extreme holes in either end of the lining. The work will now be found uniform and the lining in contact with the brake band throughout its length.

My invention will serve another purpose, however.

In the modification shown in Fig. 4, the part 24 is provided with a table 29 in line with the ledge 28 which in this case is straight. The corresponding member 26 is provided with a straight rack 33 and a table 30 aligned therewith, no hook being in this case necessary as part of the rack. The reason for this is that the left extremity of the brake band 16 may be secured together with the lining 14 under gate 3 while only hook 25 is used to oppose the band at 17 to the other extremity of the lining 15.

Sometimes the ends of the brake may be a little frayed or out of shape, and to make the apparatus entirely convenient and self-contained and provided with means for remedying this condition, a pair of jaws 18 and 19 have been provided. When the lining is misshapen as mentioned, it is but necessary to give each end a preliminary squeeze without engaging pawl 27, and subsequently to manipulate the apparatus as hereinbefore described. My invention may also be modified by tilting the lining tables as indicated at 31 and 32 if desired, and jaws 18 and 19 be provided with different faces to imprint a groove in the lining to facilitate the gates taking hold of the same.

The apparatus as disclosed in this view may also be used as a vise as well as a clamp or lining stretcher, thus illustrating the versatility and utility of my invention.

While I do not desire to be limited to include the mentioned clamp or vise jaws in the lining stretcher, as the latter will operate perfectly as such without them, I desire to reserve all such modifications including change of shape of the tables or the rack or of any other parts in a spirit commensurate with the scope of my invention.

Having thus fully described my invention, I claim—

1. A brake lining stretcher comprising a pair of related opposite members provided each with fabric gripping means upon the same and beneath with a brake band abutment.

2. A lining stretcher and clamp including a pair of engaging aligned members adapted to move relatively along their alignment, means for moving said members including a rack upon one and a rotatably mounted pinion in the other, means for flattening frayed lining including upon said members a pair of jaws adapted to meet or recede, means for gripping lining extremities including in each member a lining table and a clamp adapted to co-operate therewith.

3. In a lining stretcher including a pair of relatively movable members a frame member comprising a pair of spaced walls, a ledge upon the lower inner edge of each of said walls, a brake band stop connecting the lower corresponding corners of said walls, and a lining table connecting the other lower corresponding wall corners.

4. In a lining stretcher including a pair of relatively movable members, a frame member having a pair of spaced walls connected at the lower corresponding corners of one end by a brake band abutment and at the other lower corners by a lining table.

5. In a lining stretcher including a pair of engageable members, a rack member comprising a rack terminating at one extremity in a lining table having a pair of spaced gate bearings above the same, and terminating at the other extremity in a brake band abutment beneath the same.

6. A lining stretcher and clamp including a pair of corresponding engaged members adapted to change their relative positions, means for producing said changed positions, means for receiving fabric extremities including upon each member a convexed lining table, and means upon one of said members for engaging the extremity of a brake band including a hook located beneath said members.

7. A lining stretcher including a pair of movably engaged members whose summed longitudinal dimension is alterable by their relative movement, means for producing said movement including a rack upon one member and a pinion mounted in the second member and engaging said rack, a lining table upon each member and a fabric gripping means mounted over each of said tables, and means for engaging the extremities of a brake band including beneath each of said members a band engagement hook.

8. A lining stretcher and clamp including a pair of engaging aligned members adapted to move relatively along their alignment, means for moving said members including a rack upon one and a rotatably mounted pinion in the other, means for flattening frayed lining including upon said members a pair of jaws adapted to meet or recede, means for gripping lining extremities including in each member a lining table and a clamp adapted to co-operate therewith, and means to engage the extremity of a brake band including an engagement stop beneath one of said members.

9. A lining stretcher and clamp including a pair of relatively movable and engaged arcuate members, means for moving said members and means for retaining fabric extremities including a clamp upon each of said members.

10. In a lining stretcher including a pair of engaged and relatively movable arcuate members a female member comprising a pair of parallel spaced walls arched beneath, a ledge upon the lower inner edge of each of said walls, a brake band stop connecting the lower corresponding corners of said walls and a lining table connecting the other corresponding lower corners.

11. In a lining stretcher including a pair of engageable members, a male member comprising a pair of spaced walls connected along their lower parallel edges with an arched rack terminating as a lining table at one extremity and provided beneath the other extremity with a brake band stop, and shoulder along the two lower arched edges of said member.

12. A lining stretcher including a pair of arcuate relatively movable engaged members provided each upon its outer extremity with a brake lining table and a corresponding retaining gate above each table, a brake band stop hook beneath the inner extremity of each member, a rack upon one of said members, a pinion mounted in the second of said members and engaging said rack, a pawl likewise mounted therein to engage said pinion, a ledge upon the lower inner arched edges of one of said members and a corresponding undercut shoulder in the lower edges of the other of said members, said pinion and said ledges retaining said members assembled.

13. A lining stretcher including a pair of relatively movable engaged members provided each with a brake lining table and a corresponding retaining gate above each table, a brake band abutment hook beneath each member, a rack upon one of said members, a pinion adapted to engage said rack mounted in the second of said members, a pawl likewise mounted in said second member and adapted to engage said pinion, and a ledge upon the inner edges of the second member to support said first member, said ledges and pinion serving to retain said members in assembled relation.

Signed at 226 Flatbush Avenue, in the borough of Brooklyn, county of Kings, city and State of New York, on this 19th April 1921.

OSCAR THEODORE OHLSON.

Witnesses:
V. H. JACOBSON,
C. F. WILLIAM FORSSBERG.